UNITED STATES PATENT OFFICE.

HEINRICH BAUM, OF HÖCHST-ON-THE-MAIN, GERMANY, ASSIGNOR TO FARBWERKE, VORMALS MEISTER, LUCIUS & BRÜNING, OF SAME PLACE.

RED COLORING-MATTER.

SPECIFICATION forming part of Letters Patent No. 233,465, dated October 19, 1880.

Application filed March 13, 1880. (Specimens.)

*To all whom it may concern:*

Be it known that I, HEINRICH BAUM, of Höchst-on-the-Main, in the Empire of Germany, have invented a new and useful Improvement in Red Coloring-Matter, of which the following is a specification.

My invention has for its object the production of red coloring-matter which will withstand washing and light by using the diazo compound derived from amidoazo-benzole, instead of the diazo compounds of xylol mentioned in Patent No. 210,233, November 26, 1878, in the manner described in said patent.

This diazo compound is obtained in the following way: Eighteen pounds of the well-known amidoazo-benzole, twenty pounds of muriatic acid of 1.16 to 1.18 specific gravity, and one hundred pounds of water are well mixed, and while cooling properly seven pounds of nitrite of sodium dissolved in twenty pounds of water are added thereto. When, after reposing for a sufficient length of time, the diazo compound has formed itself completely, the solution of it is introduced into a solution of forty pounds of the disulphobetanaphtholic acid, referred to in my Patent No. 210,233 as being not readily soluble in alcohol, two hundred pounds of water, and twenty pounds of ammoniacal liquor of ten per cent. ammoniacal strength, after which operation the coloring-matter precipitates. With respect to the disulphobetanaphtholic acid, I would state that it is prepared by mixing one part of betanaphtholic acid with three parts sulphuric acid, and heating the mixture for twelve hours at a temperature of 212° to 230° Fahrenheit. Two isomeric disulphobetanaphtholic acids are thereby obtained, from which the soda salts are easily separated. One of these disulphobetanaphtholic acids is soluble in alcohol, and the other is nearly insoluble. It is the salt that is practically insoluble that I use in the production of the red coloring-matter constituting this invention.

This coloring-matter is purified by dissolving and precipitating with common salt repeatedly and dried afterward, and is brought into the market in the form of a potassium or a sodium salt.

The coloring-matters so obtained can, by the action of common sulphuric acid or of fuming sulphuric acid, according to the strength of the acid used and according to the temperature during the reaction, be converted into coloring-matters more or less soluble in water.

I do not limit myself to the exact proportions, as they may be varied without departing from the principle of my invention.

Having thus described my invention, I claim as new and desire to secure by Letters Patent—

The red coloring-matter herein described, formed by subjecting the diazo compound derived from amidoazo-benzole, as set forth, to the action of disulphobetanaphtholic acid herein described, substantially as described.

In testimony whereof I have signed my name to this specification in the presence of two subscribing witnesses.

HEINRICH BAUM.

Witnesses:
JOSEPH PATRICK,
FRANZ HASSLACHER.